United States Patent
Ahn et al.

(10) Patent No.: US 11,421,092 B2
(45) Date of Patent: Aug. 23, 2022

(54) METHOD FOR PREPARING UNIDIRECTIONALLY ALIGNED DISCONTINUOUS FIBER REINFORCEMENT COMPOSITE MATERIAL, UNIDIRECTIONALLY ALIGNED DISCONTINUOUS FIBER REINFORCEMENT COMPOSITE MATERIAL, AND SANDWICH STRUCTURE

(71) Applicant: LG Hausys, Ltd., Seoul (KR)

(72) Inventors: Seung-Hyun Ahn, Seoul (KR);
Kyung-Seok Han, Seoul (KR);
Sung-Chan Lim, Seoul (KR);
Hee-June Kim, Seoul (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 16/762,167

(22) PCT Filed: Aug. 17, 2018

(86) PCT No.: PCT/KR2018/009463
§ 371 (c)(1),
(2) Date: May 7, 2020

(87) PCT Pub. No.: WO2019/093628
PCT Pub. Date: May 16, 2019

(65) Prior Publication Data
US 2020/0262992 A1 Aug. 20, 2020

(30) Foreign Application Priority Data

| Nov. 7, 2017 | (KR) | 10-2017-0147332 |
| Jan. 16, 2018 | (KR) | 10-2018-0005682 |
| Aug. 14, 2018 | (KR) | 10-2018-0094883 |

(51) Int. Cl.
*C08J 7/04* (2020.01)
*B29C 70/14* (2006.01)
(Continued)

(52) U.S. Cl.
CPC ........... *C08J 7/04* (2013.01); *B29C 70/14* (2013.01); *B29C 70/305* (2013.01);
(Continued)

(58) Field of Classification Search
CPC .................. B29C 70/543; B29C 70/14
See application file for complete search history.

(56) References Cited

U.S. PATENT DOCUMENTS

| 4,568,008 A * | 2/1986 | Hasselqvist | A46D 3/00 |
| | | | 225/2 |
| 5,178,812 A | 1/1993 | Sanford et al. | |
| 5,580,512 A * | 12/1996 | Koon | B29C 70/14 |
| | | | 264/108 |

(Continued)

FOREIGN PATENT DOCUMENTS

| EP | 1844927 A2 | 10/2007 |
| JP | H10-109364 A | 4/1998 |

(Continued)

OTHER PUBLICATIONS

International Search Report dated Dec. 6, 2018, in connection with corresponding International Patent Application No. PCT/KR2018/009463.

(Continued)

*Primary Examiner* — Niki Bakhtiari
*Assistant Examiner* — John J DeRusso
(74) *Attorney, Agent, or Firm* — Hauptman Ham, LLP (57) ABSTRACT

Provided are a method for preparing a unidirectionally aligned discontinuous fiber reinforcement composite material, a unidirectionally aligned discontinuous fiber reinforce-
(Continued)

ment composite material, and a sandwich structure. The method for preparing a unidirectionally aligned discontinuous fiber reinforcement composite material comprises discontinuously aligning short fibers on a polymer substrate in one direction by using an air-laid method.

4 Claims, 3 Drawing Sheets

(51) Int. Cl.
*C08J 5/04* (2006.01)
*B29C 70/30* (2006.01)
*B29C 70/54* (2006.01)
*B32B 5/12* (2006.01)
*B32B 27/12* (2006.01)
*B32B 27/18* (2006.01)
*B32B 27/32* (2006.01)

(52) U.S. Cl.
CPC .............. *B29C 70/543* (2013.01); *B32B 5/12* (2013.01); *B32B 27/12* (2013.01); *B32B 27/18* (2013.01); *B32B 27/32* (2013.01); *C08J 5/042* (2013.01); *B32B 2250/03* (2013.01); *B32B 2250/40* (2013.01); *B32B 2260/021* (2013.01); *B32B 2260/046* (2013.01); *B32B 2262/101* (2013.01); *B32B 2262/106* (2013.01); *B32B 2307/54* (2013.01); *B32B 2307/546* (2013.01); *C08J 2323/12* (2013.01)

(56) References Cited

U.S. PATENT DOCUMENTS

| | | | |
|---|---|---|---|
| 8,354,156 | B2 | 1/2013 | Taketa et al. |
| 2007/0238378 | A1 | 10/2007 | Conover |
| 2007/0269645 | A1 | 11/2007 | Raghavendran et al. |
| 2016/0089853 | A1 | 3/2016 | Meure et al. |

FOREIGN PATENT DOCUMENTS

| | | |
|---|---|---|
| KR | 10-0186046 B1 | 5/1999 |
| KR | 10-2007-0100134 A | 10/2007 |
| KR | 10-2009-0113820 A | 11/2009 |
| WO | 2015041912 A2 | 3/2015 |
| WO | 2016208731 A1 | 12/2016 |
| WO | 2017145883 A1 | 8/2017 |

OTHER PUBLICATIONS

Extended European Search Report dated Nov. 4, 2020, in connection with the counterpart European Patent Application No. EP18875897.3.
Korean Notice of Allowance dated Sep. 14, 2021, in connection with the Korean Patent Application No. 10-2018-0094883.
Takushi Miyake et al., "A dry aligning method of discontinuous carbon fibers and improvement of mechanical properties of discontinuous fiber composites", Advanced Manufacturing: Polymer & Composites Science, Dec. 22, 2016, vol. 2, Nos. 3-4, pp. 117-123.
H. Yu et al., "A novel manufacturing method for aligned discontinuous fibre composites (High Performance—Discontinuous Fibre method)", Composites: Part A, Jun. 22, 2014, pp. 175-185.

* cited by examiner

METHOD FOR PREPARING UNIDIRECTIONALLY ALIGNED DISCONTINUOUS FIBER REINFORCEMENT COMPOSITE MATERIAL, UNIDIRECTIONALLY ALIGNED DISCONTINUOUS FIBER REINFORCEMENT COMPOSITE MATERIAL, AND SANDWICH STRUCTURE

CROSS-REFERENCE TO RELATED APPLICATION

The present application is a national stage filing under 35 U.S.C § 371 of PCT application number PCT/KR2018/009463 filed on Aug. 17, 2018 which is based upon and claims the benefit of priorities to Korean Patent Application No. 10-2017-0147332, filed on Nov. 7, 2017, Korean Patent Application No. 10-2018-0005682, filed on Jan. 16, 2018, and Korean Patent Application No. 10-2018-0094883, filed on Aug. 14, 2018, in the Korean Intellectual Property Office, which are incorporated herein in their entireties by reference.

TECHNICAL FIELD

The present disclosure relates to a method for producing an unidirectionally-aligned discontinuous fiber-reinforced composite, an unidirectionally-aligned discontinuous fiber-reinforced composite, and a sandwich structure.

BACKGROUND

A continuous fiber-reinforced composite has excellent mechanical strength, but has low elongation, leading to a disadvantage that there is difficulty in molding of a part with a complex design using the continuous fiber-reinforced composite. On the other hand, a randomly aligned fiber-reinforced composite is excellent in formability but has a disadvantage in that mechanical strength thereof is relatively lowered.

A unidirectionally-aligned discontinuous fiber-reinforced composite (ADF) in which short fibers are discontinuously and unidirectionally aligned has both of high mechanical strength and excellent formability. Thus, the ADF is recently attracting attention as means to improve performance of recycled carbon fiber and glass fiber.

A conventional unidirectionally-aligned discontinuous fiber-reinforced composite (ADF) have been produced primarily using a top-down process such as stretch broken or slitting approach in which a continuous fiber reinforced material is cut in a post process.

DISCLOSURE

Technical Purpose

However, the approach of cutting the continuous fiber reinforced material in the post-process may not be applied to a recycled reinforcing fiber mainly having a short-fiber type, and has limitation in improving the formability.

A purpose of the present disclosure is to provide a method to produce an unidirectionally-aligned discontinuous fiber-reinforced composite (ADF) using reinforcing short-fibers.

Further, another purpose of the present disclosure is to provide an unidirectionally-aligned discontinuous fiber-reinforced composite (ADF) obtained using the method for producing the unidirectionally-aligned discontinuous fiber-reinforced composite (ADF).

Further, still another purpose of the present disclosure is to provide a sandwich structure including the unidirectionally-aligned discontinuous fiber-reinforced composite (ADF) obtained using the method for producing the unidirectionally-aligned discontinuous fiber-reinforced composite (ADF).

However, the technical purposes that the present disclosure seeks to achieve are not limited to those as mentioned above. Still other purposes as not mentioned will be clearly understood by those skilled in the art from following descriptions.

Technical Solution

A method for producing an unidirectionally-aligned discontinuous fiber-reinforced composite (ADF) includes discontinuously and unidirectionally aligning short-fibers on a polymer base using an air-laid method.

The method for producing the unidirectionally-aligned discontinuous fiber-reinforced composite includes applying air to the short-fibers such that the short-fibers are inserted into a plurality of channels; and aligning the short-fibers discharged from the plurality of channels unidirectionally on the polymer base disposed below the plurality of channels. Each of the plurality of channels has an outlet area smaller than an inlet area thereof, and includes a hollow having an inclined face extending from the inlet to the outlet.

An unidirectionally-aligned discontinuous fiber-reinforced composite (ADF) is obtained using the method for producing the unidirectionally-aligned discontinuous fiber-reinforced composite and includes a polymer base; and short-fibers discontinuously and unidirectionally aligned on the polymer base. A percentage of short-fibers whose long-sides are aligned at an angle within +14° with respect to an exact unidirectional alignment direction is 92% or greater.

The unidirectionally-aligned discontinuous fiber-reinforced composite (ADF) satisfies a following relationship (1):

$$0.92 \leq (0° \text{ specimen tensile strength} - 90° \text{ specimen tensile strength})/0° \text{ specimen tensile strength} < 1.00 \qquad \text{Relationship (1),}$$

wherein in the relationship 1, the 0° specimen tensile strength refers to a tensile strength in a direction parallel to the unidirectionally aligned direction of the short-fibers, wherein the 90° specimen tensile strength refers to a tensile strength in a direction perpendicular to the unidirectionally aligned direction of the short-fibers.

A sandwich structure includes a first skin layer; a second skin layer; and a core layer disposed between the first skin layer and the second skin layer, wherein at least one of the first skin layer or the second skin layer includes the unidirectionally-aligned discontinuous fiber-reinforced composite (ADF).

Technical Effect

The present disclosure may provide the method to produce the unidirectionally-aligned discontinuous fiber-reinforced composite (ADF) using reinforcing short-fibers, and provide the unidirectionally-aligned discontinuous fiber-reinforced composite (ADF) produced using the method.

The sandwich structure according to the present disclosure may include the unidirectionally-aligned discontinuous fiber-reinforced composite (ADF) and thus have a high structural rigidity of the same level as that of a sandwich structure including a continuous fiber-reinforced composite is applied and have a higher design degree of freedom than that of the latter.

The effects of the present disclosure are not limited to those as mentioned above. Other effects as not mentioned will be clearly understood by those skilled in the art from descriptions of the claims.

DETAILED DESCRIPTIONS

Advantages and features of the present disclosure and methods of achieving them will be apparent with reference to embodiments and experimental examples as described below in detail in conjunction with the accompanying drawings. It is to be noted that the accompanying drawings are intended only for the skilled person to the art to easily understand a spirit of a technology disclosed in the disclosure, and are not to be construed as limiting the spirit of the technology to the accompanying drawings.

Further, the present disclosure is not limited to descriptions as disclosed below, but may be implemented in various forms. The descriptions disclosed below is intended to complete the present disclosure and is provided to fully inform the person of ordinary skill in the technical field to which the present disclosure belongs of the scope of the disclosure. The present disclosure is only defined by the scope of the claims.

When it is determined that specific descriptions of related known components may obscure a gist of the technology, the detailed descriptions thereof may be omitted. Like reference numerals refer to like elements throughout the disclosure. In the drawings, sizes and relative sizes of layers and regions may be exaggerated for clarity of illustration.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", "including", "has" and "having" when used in this specification, specify the presence of the stated features, integers, operations, elements, and/or components, but do not preclude the presence or addition of one or more other features, integers, operations, elements, components, and/or portions thereof.

Throughout the specification, "A and/or B" may mean A, B or A and B unless otherwise specified. "C to D" may mean C inclusive to D inclusive unless otherwise specified.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of an element in use or in operation, in addition to the orientation depicted in the figures.

Hereinafter, a method for producing an unidirectionally-aligned discontinuous fiber-reinforced composite (ADF) is illustrated. The method for producing the unidirectionally-aligned discontinuous fiber-reinforced composite (ADF) includes discontinuously and unidirectionally aligning short-fibers on a polymer base using an air-laid method.

Figure 1:
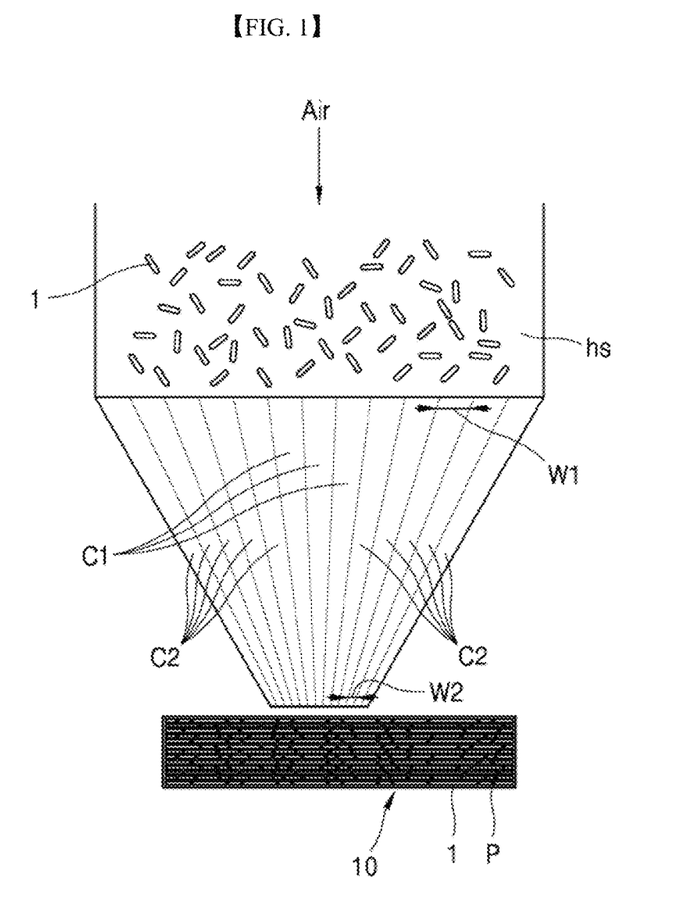
FIG. 1 schematically shows an example of a method for producing an unidirectionally-aligned discontinuous fiber-reinforced composite (ADF) using an air-laid method.
Figure 2:
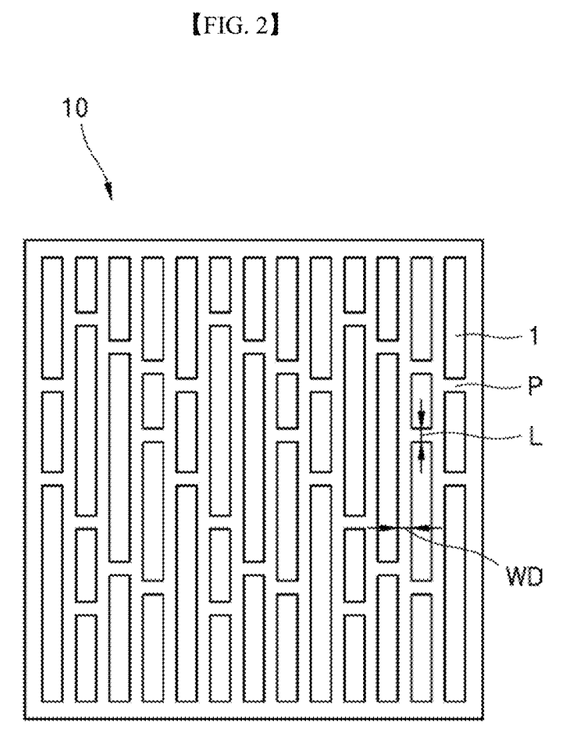
FIG. 2 schematically shows an example of an unidirectionally-aligned discontinuous fiber-reinforced composite (ADF) produced using the air-laid method.

FIG. 1 schematically shows an example of a method for producing an ADF 10 using the air-laid method. FIG. 2 schematically shows an example of the unidirectionally-aligned discontinuous fiber-reinforced composite (ADF) 10 produced using the air-laid method.

Referring to FIG. 1, the method for producing the ADF 10 may include inserting short-fibers 1 into a storage space "hs" inside a hopper and applying air to the short-fibers 1 such that at least some of the short-fibers 1 is introduced into a plurality of channels C1 and C2. The method for producing the ADF 10 involves discharging the at least some short-fibers 1 of the short-fibers 1 introduced into the plurality of channels C1 and C2 from the hopper through the plurality of channels C1 and C2 and dropping the short-fibers 1 discharged from the hopper onto a polymer base P to allow the short-fibers 1 to be discontinuously and unidirectionally aligned on the polymer base P.

The hopper includes the storage space "hs" and the plurality of channels C1 and C2 in communication with the storage space "hs". The plurality of channels C1 and C2 communicate with the storage space "hs" at a bottom of the storage space "hs".

Each of the plurality of channels C1 and C2 has an outlet width W2 smaller than an inlet width W1 and has a hollow with an inclined face extending from an inlet to an outlet. Each of the multiple of channels C1 and C2 may have a larger inlet width W1 compared to a long-side length of each of the short-fibers 1. The outlet width W2 may be larger than a diameter of each of the short-fibers 1 or a short side length thereof. For example, each of the short-fibers 1 may have a short side length of 6 μm to 40 μm, and a long-side length of 3 mm to 70 mm. In this case, the width W1 of the inlet may be 3 mm to 100 mm and the width W2 of the outlet may be between 40 μm and 200 m.

When air is applied to the short-fibers 1 in the storage space "hs", the short-fibers 1 may be suspended in the air within the storage space "hs" in a random state in which alignments thereof is random. When air is applied to the short-fibers 1, at least some of the short-fibers 1 may enter the hollow of each of the plurality of channels C1 and C2. The long-side of each of the short-fibers 1 as introduced into the multiple of channels C1 and C2 may be aligned in the hollow in a direction of the inclined face of the hollow. The short-fibers 1 may be then discharged from the hopper into a state where the long-sides thereof are aligned in the direction of the inclined face of the hollow and may be added on the polymer base P disposed below the channels.

The polymer base P may be placed on a conveyor belt and may move along a direction of movement of the conveyor belt. Since the short-fibers 1 from the hopper are added on the polymer base P at varying timings, the Short-fibers 1 may be discontinuously and unidirectionally aligned on the polymer base P.

The unidirectionally aligned direction of each of the short-fibers 1 may be parallel to a length-direction of the polymer base P or may be parallel to a width direction of the polymer base P or may be oblique to the length-direction or the width direction of the polymer base P. For example, FIG. 1 shows that the long-side of each of the short-fibers 1 is discontinuously unidirectionally aligned in the length-direction of the polymer base P or the movement direction of conveyor belt.

An example of the method for evenly arranging the short-fibers 1 on the polymer base P may include freely dropping the short-fibers 1 from the hollow of each of the plurality of channels C1 and C2, blowing compressed air into the hollows of the plurality of channels C1 and C2, suctioning air from the hollows of the plurality of channels C1 and C2, or a combination thereof.

The plurality of channels C1 and C2 may include first channels C1 and second channels C2. The plurality of channels C1 and C2 may be divided into the first channels C1 and the second channels C2 based on the positions of the plurality of channels C1 and C2. Among the plurality of channels C1 and C2, those located in an inner region may be the first channels C1, and those arranged outwardly of the first channels C1 may be the second channels C2.

Each of all of the first channels C1 and the second channels C2 may be embodied in a form of an open tube in which the hollow is completely open. Each of the short-fibers 1 as introduced into the hollow of each of the plurality of channels C1 and C2 through each inlet may be discharged along the inclined face of the hollow out of the hopper through each outlet of each channel. The hollow inclination of each of the first channels C1 may be larger than the hollow inclination of each of the second channels C2.

When the short-fibers 1 as introduced into the second channels C2 are discharged from the hopper through the outlets along the inclined faces of the hollows of the second channels C2, the short-fibers 1 may fall down on the polymer base P in a state in which the long-side thereof is inclined at about A° angle (where A° is an acute angle) relative to a top face of the polymer base P. When the short-fibers 1 as introduced into the first channels C1 are discharged from the hopper through the outlets along the inclined faces of the hollows of the first channels C1, the short-fibers 1 may fall down on the polymer base P in a state in which the long-side thereof is inclined at about B° angle (where B° is an acute angle and larger than A°) relative to the top face of the polymer base P. In one example, A° is 45° and B° is 70°. The B° direction may be substantially parallel to the gravity direction.

In this case, in order to allow the long-sides of the short-fibers 1 introduced into the first channels C1 to be substantially parallel to one face of the polymer base P, an additional process of laying down the short-fibers 1 standing on the polymer base P using a roller or the like is further performed. This may lower a process efficiency of the ADF producing method. In some cases, the alignment direction of some short-fibers 1 may be different from the alignment direction of the other short-fibers 1.

In another example, each of the first channels C1 may be embodied in a form of a closed tube in which the hollow is at least partially blocked, while each of the second channels C2 may be embodied in a form of an open tube in which at least a portion of the hollow is not blocked. Designing each of the first channels C1 as the closed tube may allow the long-side of each of the short-fibers 1 added to the polymer base P through each of the first channels C1 not to be substantially perpendicularly to a top face of the polymer base P. In other words, the long-side of each of the short-fibers 1 added to the polymer base P through each of the first channels C1 may not be substantially parallel to a gravity direction. Further, immediately after the short-fibers 1 fall to the polymer base P through the second channels C2, the long sides of the short-fibers 1 added to the polymer base P through the second channels C2 may be oriented to be substantially parallel to the top face of the polymer base P only by gravity without any further operation.

Each of the short-fibers 1 may have a short side length of 6 μm to 40 μm, and a long-side length of 3 mm to 70 mm. The short-fibers 1 may include, for example, glass fibers, carbon fibers, aramid fibers, polypropylene fibers, polyethylene terephthalate fibers, polybutylene terephthalate fibers, polyethylene fibers or natural fibers, and the like. However, the present disclosure is not limited only thereto.

The polymer base P may improve shock absorption performance and elongation of ADF 10. For example, the polymer base P may be made of one of a thermoplastic resin and a thermosetting resin. Various kinds of thermoplastic resins or thermosetting resins may be selected depending on a type of a product and a required performance. For example, the polymer base P may be made of a thermoplastic resin such as at least one of polypropylene (PP) resin, polyethylene terephthalate (PET) resin, polyethylene (PE) resin, polyamide (PA) resin, epoxy resin, phenol resin, urea resin, and melamine resin.

In one example, the ADFs 10 of varying weights may be produced depending on a movement speed of the conveyor belt. The movement speed of the conveyor belt may be, for example, 2 m/min to 20 m/min. In this connection, the weight of the ADF 10 may be between 20 g/m$^2$ and 200 g/m$^2$.

Referring to FIG. 2, the ADF 10 includes the polymer base P and the discontinuously unidirectionally aligned short-fibers 1 on the polymer base P. The short-fibers 1 being aligned discontinuously means that the short-fibers 1 are spaced apart from each other. The ADF 10 has a high unidirectionally aligned percentage of the short-fibers 1. The unidirectionally aligning of the short-fibers 1 may mean that the long-sides of the short-fiber 1 are aligned unidirectionally at an angle within ±14 degrees with respect to an exact unidirectionally aligned direction of the short-fibers 1. The ADF 10 has 92% or greater of a unidirectionally aligned percentage thereof.

The unidirectionally aligned direction of the short-fibers 1 may be a direction parallel to the length-direction of the polymer base P or may be in a direction parallel to the width direction of the polymer base P, or may be a direction oblique to the length-direction or the width direction of the polymer base P.

A term "reinforcement required direction" means a predetermined direction in which strength and rigidity of a reinforced composite need to be enhanced in consideration of an external force or load applied from an outside when an article including the reinforced composite is mounted on a vehicle or an aircraft, or when, after being mounted, the vehicle or the aircraft moves. This reinforcement required direction may be determined based on a confining position, an installation condition, etc. when the article to which the reinforced composite is applied is mounted to a part of the vehicle or the aircraft. Most primarily, the reinforcement required direction means one direction in which the strength and rigidity of the composite need to be complemented.

The reinforced composite may be a stack of multiple ADFs 10. The stack of the multiple ADFs 10 may include a first ADF 10 in which the short-fibers are aligned unidirectionally in a first direction having an angle of +θ° relative to the reinforcement required direction and a second ADF 10 in which the short-fibers are aligned unidirectionally in a second direction having an angle of −θ° relative to the reinforcement required direction. In this connection, θ° may be 1° to 44°.

In other words, the unidirectionally aligned direction of the short-fibers 1 may have ±θ° relative to the reinforcement required direction.

FIG. 2 shows that the long-sides of the short-fibers 1 are discontinuously unidirectionally aligned in the length-direction of the polymer base P. As shown in FIG. 2, the short-fibers 1 may be spaced apart from each other at a spacing L and may be aligned along the length-direction of the polymer base P. The short-fibers 1 may be spaced apart from each other at a spacing WD and may be arranged along the width-direction of the polymer base P.

In one example, the ADF 10 satisfies a following relationship (1).

$$0.92 \leq (0° \text{ specimen tensile strength} - 90° \text{ specimen tensile strength})/0° \text{ specimen tensile strength} < 1.00 \qquad \text{Relationship (1)}$$

In the above relationship 1, the 0° specimen tensile strength refers to a tensile strength in a direction parallel to the unidirectionally aligned direction of the short-fibers, while the 90° specimen tensile strength refers to a tensile strength in a direction perpendicular to the unidirectionally aligned direction of the short-fibers.

When a result of a middle term of the relationship (1) is 1.00, this means that 100% of short-fibers 1 are unidirectionally aligned. When the result of the middle term of the relationship 1 is smaller than or equal to 0.50, this means that the short-fibers 1 are not unidirectionally aligned. The ADF 10 has the result of the middle term of the relationship 1 being 0.95 and thus has high unidirectionally aligned percentage of the short-fibers 1.

A sandwich structure may be composed of skin layers having high tensile strength and a core layer interposed therebetween and may be attracting attention as a high rigidity composite for automobiles because of its high structural rigidity and light weight. The sandwich structure may be used, by way example, as a bumper beam for a vehicle, a seat back frame for a vehicle, or the like.

In general, in order to ensure high tensile strength, a metal plate has been used as the skin layer. Recently, research on application of the continuous fiber-reinforced composite has been made due to demand for weight reduction.

The continuous fiber-reinforced composite has excellent tensile strength in a short direction. However, because reinforcing fibers are continuously and unidirectionally aligned in the composite, the formability may be lowered.

Figure 3:
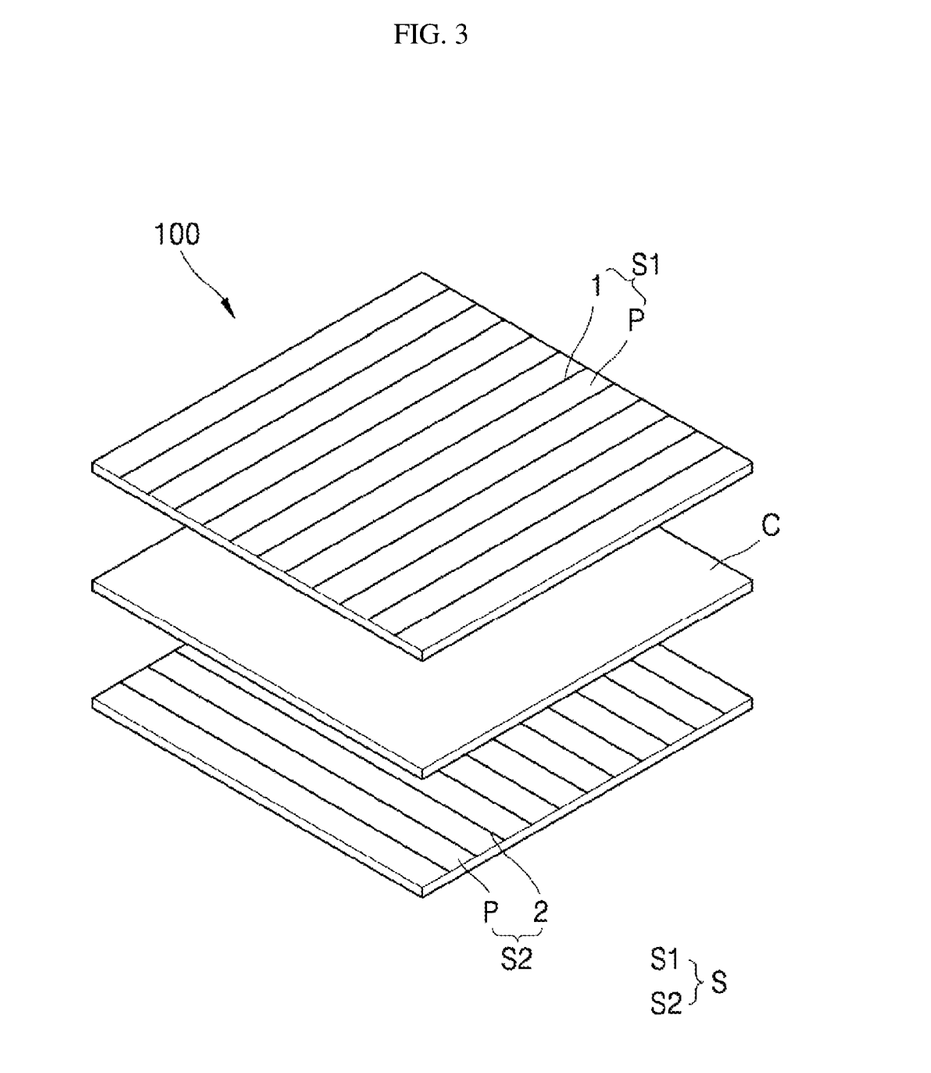
FIG. 3 is a schematic cross-sectional view of a sandwich structure.

FIG. 3 shows a schematic cross-sectional view of a sandwich structure 100. Referring to FIG. 3, the sandwich structure 100 includes a first skin layer S1, a second skin layer S2 and a core layer C. The core layer C is disposed between the first skin layer S1 and the second skin layer S2. The core layer C includes porous material.

Each of the first skin layer S1 and the second skin layer S2 includes the unidirectionally-aligned discontinuous fiber-reinforced composite (ADF) 10 of FIG. 2. In other words, the first skin layer S1 includes first short-fibers 1 and a first polymer base P. The second skin layer S2 includes second short-fibers 2 and a second polymer base P.

The core layer C has specific gravity and structural rigidity lower than those of each of the first skin layer S1 and the second skin layer S2. For example, when each of the first skin layer S1 and the second skin layer S2 is composed of the ADF of FIG. 2, the core layer C includes porous material having lower specific gravity and structural rigidity than those of the ADF of FIG. 2.

Each of the first skin layer S1 and the second skin layer S2 may be composed of a single layer or multiple layers. When each of the first skin layer S1 and the second skin layer S2 is composed of multiple layers, the number of layers of the first skin layer S1 is equal to the number of layers of the second skin layer S2 with the core layer C interposed therebetween so that uniform rigidity and specific energy absorption are achieved upon application of an external force to a top and a bottom of the sandwich structure 100.

In other words, the first skin layer S1 and the second skin layer S2 may be arranged symmetrically with each other with respect to the core layer C interposed therebetween. In this way, the sandwich structure 100 may have uniform rigidity and specific energy absorption with respect to the external force applied to both the top and the bottom thereof.

To improve the rigidity, the elongation and the specific energy absorption of the sandwich structure 100, the alignment directions of the first short-fibers 1 and the second short-fibers 2 may be different from each other. The first short-fiber 1 of the first skin layer S1 may be unidirectionally aligned in a first direction, while the second short-fiber 2 of the second skin layer S2 may be unidirectionally aligned in a second direction that is not parallel to the first direction. For example, the alignment direction of the first short-fiber 1 may have an angle of +1° to +44° with respect to the reinforcement required direction, while the alignment direction of the second short-fiber 2 may have an angle of −1° to −44° with respect to the reinforcement required direction. For example, an angle of the unidirectionally aligned direction (the first direction) of the first short-fiber 1 and an angle of the unidirectionally aligned direction (the second direction) of the second short-fiber 2 may have a difference of approximately 30° to 90° therebetween.

In one example, the sandwich structure 100 may further include adhesive (not shown). The adhesive (not shown) may be coated on the skin layers S and the core layer C to improve bonds between the layers of the sandwich structure 100. In this manner, the rigidity of the sandwich structure 100 may be further improved.

The adhesive (not shown) may be impregnated into the skin layers S and the core layer C using a composite molding process such as RTM (Resin Transfer Molding), WCM (Wet Compression Molding), PCM (Prepreg Compression Molding), HP (Hot Press) and the like.

The composite molding process includes interposing the core layer C between the skin layers S and then injecting adhesive (not shown) to impregnate and cure the adhesive (not shown) into the skin layers S and the core layer C such that the skin layers S and core layer C may be integrated with each other.

Hereinafter, the porous material constituting the core layer C will be described. Examples of the porous material may include porous fiber-reinforced thermoplastics and thermoplastic resin foams.

The porous fiber-reinforced thermoplastics may include a reinforcing fiber mat and a thermoplastic polymer resin impregnated in the reinforcing fiber mat. The porous fiber-reinforced thermoplastics may realize the core layer C having high elongation. Thus, the sandwich structure 100 may have high formability or high design degree of freedom.

A porosity of the porous fiber-reinforced thermoplastic may be determined according to a required strength and rigidity of a product to which the sandwich structure 100 is applied. In a non-limiting example, the porosity of the porous fiber-reinforced thermoplastic may be 40% to 80% by volume.

The porous fiber-reinforced thermoplastics have an open cell structure. During a forming process of the sandwich structure 100, the open cell structure may act as a flow path to maintain flow of the adhesive (not shown) between the first short-fiber 1 and the second short-fiber 2. Then, after the molding is completed, the open cell is filled with the adhesive (not shown) to form a closed cell structure.

The reinforcing fibers may be classified into long reinforcing fibers, short reinforcing fibers, and continuous reinforcing fibers, depending on a shape. The reinforcing fiber mat may be obtained from at least one reinforcing fiber of the long reinforcing fiber, the short reinforcing fiber, and the continuous reinforcing fiber.

Further, the reinforcing fibers may be classified into a glass fiber, a carbon fiber, a aramid fiber, a polypropylene fiber, a polyethylene terephthalate fiber, a polybutylene terephthalate fiber, a polyethylene fiber, natural fiber, etc. based on a material. The reinforcing fiber mat may include, for example, at least one of the glass fiber, the carbon fiber, the aramid fiber, the polypropylene fiber, the polyethylene terephthalate fiber, the polybutylene terephthalate fiber, the polyethylene fiber, or the natural fiber.

Non-limiting examples of the thermoplastic polymer resin include polypropylene (PP) resin, polyethylene terephthalate (PET) resin, polyethylene (PE) resin, polyamide (PA) resin and the like.

In one example, non-limiting examples of the thermoplastic resin foams may include polyolefin foams such as polyethylene foams, polypropylene foams, polystyrene foams, polyester foams, and the like.

Hereinafter, with reference to FIG. 2, the ADF 10 will be described. The ADF 10 includes the polymer base P and the short-fibers 1 discontinuously and unidirectionally aligned on the polymer base P. The ADF 10 has highly unidirectionally aligned percentage of the short-fibers 1. The unidirectionally aligning of the short-fibers 1 may mean that the long-sides of the short-fiber 1 are aligned unidirectionally at an angle within ±14 degrees with respect to an exact unidirectionally aligned direction of the short-fibers 1. The ADF 10 has 92% or greater of a unidirectionally aligned percentage of thereof.

The unidirectionally aligned direction of the short-fibers 1 may be a direction parallel to the length-direction of the polymer base P or may be in a direction parallel to the width direction of the polymer base P, or may be a direction oblique to the length-direction or the width direction of the polymer base P.

FIG. 2 shows that the long-sides of the short-fibers 1 are discontinuously unidirectionally aligned in the length-direction of the polymer base P. As shown in FIG. 2, the short-fibers 1 may be spaced apart from each other at a spacing L and may be aligned along the length-direction of the polymer base P. The short-fibers 1 may be spaced apart from each other at a spacing WD and may be arranged along the width-direction of the polymer base P.

In one example, the ADF 10 satisfies a following relationship (1).

$$0.92 \leq (0° \text{ specimen tensile strength} - 90° \text{ specimen tensile strength})/0° \text{ specimen tensile strength} < 1.00 \quad \text{Relationship (1)}$$

In the above relationship 1, the 0° specimen tensile strength refers to a tensile strength in a direction parallel to the unidirectionally aligned direction of the short-fibers, while the 90° specimen tensile strength refers to a tensile strength in a direction perpendicular to the unidirectionally aligned direction of the short-fibers.

When a result of a middle term of the relationship (1) is 1.00, this means that 100% of short-fibers 1 are unidirectionally aligned. When the result of the middle term of the relationship 1 is smaller than or equal to 0.50, this means that the short-fibers 1 are not unidirectionally aligned. The ADF 10 has the result of the middle term of the relationship 1 being 0.95 and thus has high unidirectionally aligned percentage of the short-fibers 1.

The ADF 10 exhibits tensile strength equivalent to that of the continuous fiber-reinforced composite since the short-fibers 1 in the ADF 10 are unidirectionally aligned and spaced from each other in the alignment direction and are spacedly arranged in a substantially parallel to each other in a direction perpendicular to the alignment direction. At the same time, the high elongation of the skin layers S in the sandwich structure 100 may allow high formability or high design degree of freedom.

The sandwich structure 100 is lighter than the conventional sandwich structure including the metal plate. The sandwich structure 100 has a high structural rigidity equivalent to that of the conventional sandwich structure including the continuous fiber-reinforced composite, but has excellent design freedom compared to the conventional sandwich structure including the continuous fiber-reinforced composite.

The sandwich structure 100 may have a flexural strain greater than 5.2% as measured according to ASTM D790.

The sandwich structure 100 may have a flexural strength greater than 202 MPa as measured according to ASTM D790.

The sandwich structure 100 may have a flexural modulus greater than 14.7 GPa as measured according to ASTM D790.

Example 1

Air was applied to carbon short-fibers dispersed in the air in the hopper to introduce the short-fibers into the plurality of channels. After the carbon short-fibers pass through the multiple of channels, the short-fibers were added into the polymer base moving on the conveyor belt below the hopper to obtain ADF.

Width of channel inlet: 50 mm

Width of channel outlet: 80 μm

Channel inclination: 45°

Diameter of carbon short-fiber: 10 μm

Long-side length of carbon short-fiber: 6 mm

Polymer base: polypropylene

Carbon fiber: polymer base composition ratio=carbon fiber 60% by weight polymer base 40% by weight

Comparative Example 1

ADF was obtained in the same way as in Example 1, except that the inclination of the channel of the hopper was changed as follows.
Channel inclination: 90°

Comparative Example 2

Discontinuous fibers were obtained in the same manner as in Example 1 using a hopper without a channel.

Comparative Example 3

A wet-laid method (H. Yu et. al. Composites Part A: Applied Science and Manufacturing Vol. (2014), p 175) was used to obtain ADF.

Comparative Example 4

A dry-laid method (Takushi Miyake et. Al. Advanced Manufacturing: Polymer & Composites science (2016)) was used to obtain ADF.

Experimental Example 1

The unidirectionally aligned percentage and an alignment-based tensile effect of the short-fibers in each ADF were obtained from the ADF obtained in each of Example 1 and Comparative Example 1. Table 1 summarizes the experimental results. The alignment-based tensile effect was obtained via the relationship 1.

TABLE 1

| Examples | Unidirectionally aligned percentage (%) | Alignment-based tensile effect |
|---|---|---|
| Example 1 | 92 | 0.95 |
| Comparative Example 1 | 81 | 0.84 |
| Comparative Example 2 | 48 | 0.65 |
| Comparative Example 3 | 95 | 0.91 |
| Comparative Example 4 | 70 | 0.80 |

Example 2

Two ADFs obtained in Example 1, and 60 weight % of glass fibers, each having a diameter of 17 micrometers (μm) disposed between the two ADFs obtained in Example 1 were immersed in 40 weight % of polypropylene resin matrix. The fiber-reinforced plastic having an unidirectional alignment was placed. The adhesive was impregnated and cured therein via the composite molding process. An experimental group sandwich structure was produced. In the experimental group sandwich structure, a crossing angle between the first short-fiber in the first skin layer and the second short-fiber in the second skin layer was 90°.

Comparative Example 5

A control sandwich structure was prepared in the same manner as in Example 2, except that, instead of the two ADFs obtained in Example 1, 60% by weight of glass fibers, each having a diameter of 17 μm was impregnated in 40% by weight of the polypropylene resin matrix, and continuous fiber-reinforced composites having an unidirectional alignment were used as the first and second skin layers.

Comparative Example 6

A control sandwich structure was prepared in the same manner as in Example 2, except that, instead of the two ADFs obtained in Example 1, the ADF obtained in Comparative Example 1 was used as each of the first skin layer and the second skin layer.

Comparative Example 7

A control sandwich structure was prepared in the same manner as in Example 2, except that, instead of the two ADFs obtained in Example 1, the ADF obtained in Comparative Example 2 was used as each of the first skin layer and the second skin layer.

Comparative Example 8

A control sandwich structure was prepared in the same manner as in Example 2, except that the polyurethane foam was disposed between the two ADFs obtained in Example 1.

Experimental Example 2

A flexural strength, a flexural modulus, and a flexural strain were measured using the sandwich structures obtained in Example 2 and Comparative Examples 5 to 8. The measurement standard was ASTM D790, a test piece was 50×150×3 mm piece, a span length was 100 mm, and a test speed was 5 mm/min. Table 2 summarizes the results.

TABLE 2

| Examples | Flexural strength (MPa) | Flexural modulus (GPa) | Flexural strain (%) |
|---|---|---|---|
| Example 2 | 223 | 15.4 | 6.0 |
| Comparative Example 5 | 238 | 15.6 | 1.9 |
| Comparative Example 6 | 195 | 12.3 | 5.2 |
| Comparative Example 7 | 113 | 5.5 | 4.8 |
| Comparative Example 8 | 202 | 14.7 | 3.3 |

Example 2 shows increase in the flexural strain by about 300% compared with Comparative Example 5 using the continuous fiber reinforced thermoplastic resin as the skin layer while having the same flexural strength as that of Comparative Example 5.

Example 2 showed higher levels of the flexural strength and the flexural strain than those of Comparative Examples 6 and 7. This is because the ADF used as the skin layers applied to Example 2 shows the high unidirectionally aligned percentage.

Example 2 showed increase in the flexural strain by about 180% compared with Comparative Example 8 where the polyurethane foam was applied as the core layer. This is due to the high elongation of the core layer itself used in Example 2.

It was confirmed based on the above experimental results that the sandwich structure according to the Example including the ADF-based skin layers and the porous fiber-reinforced composite-based core layer has the higher flexural rigidity and the higher forming degree of freedom, compared to those of the sandwich structure according to the Comparative Examples.

The embodiments have been described above with reference to the accompanying drawings. The present disclosure is not limited to the embodiments, but may be produced in various forms by combining the contents disclosed in the embodiments. Those skilled in the art will appreciate that the present disclosure may be embodied in other specific forms without changing the technical spirit or essential characteristics of the present disclosure. Therefore, the above-described embodiments are to be understood in all respects as illustrative and not restrictive.

What is claimed is:

1. A method for producing a unidirectionally-aligned discontinuous fiber-reinforced composite, the method comprising:

applying air to short-fibers such that the short-fibers are inserted into a plurality of channels; and aligning the short-fibers discharged from the plurality of channels unidirectionally on a polymer base disposed below the plurality of channels, wherein each of the plurality of channels has an outlet area smaller than an inlet area, and includes a hollow having an inclined face extending from the inlet to the outlet.

2. The method for producing the unidirectionally-aligned discontinuous fiber-reinforced composite of claim 1, wherein a width of the inlet is larger than a long-side length of each of the short-fibers, wherein a width of the outlet is larger than a diameter of each of the short-fibers.

3. The method for producing the unidirectionally-aligned discontinuous fiber-reinforced composite of claim 1, wherein a diameter of each of the short-fibers is in a range of 6 μm and 40 μm, and a long-side length of each of the short-fibers is in a range of 3 mm to 70 mm.

4. The method for producing the unidirectionally-aligned discontinuous fiber-reinforced composite of claim 3, wherein a width of the inlet is larger than or equal to 24 mm, and a width of the outlet is in a range of 40 μm to 100 μm.

* * * * *